(12) United States Patent
Dupré

(10) Patent No.: US 10,684,805 B2
(45) Date of Patent: Jun. 16, 2020

(54) METHOD AND PRINTING SYSTEM FOR PROCESSING A PRINTJOB

(71) Applicant: Océ Holding B.V., Venlo (NL)

(72) Inventor: Michaël Dupré, Brunoy (FR)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 0 days.

(21) Appl. No.: 15/912,974

(22) Filed: Mar. 6, 2018

(65) Prior Publication Data

US 2018/0260170 A1 Sep. 13, 2018

(30) Foreign Application Priority Data

Mar. 8, 2017 (EP) .................................... 17159853

(51) Int. Cl.
*G06F 3/12* (2006.01)
*G06K 15/02* (2006.01)

(52) U.S. Cl.
CPC ............ *G06F 3/1208* (2013.01); *G06F 3/121* (2013.01); *G06F 3/1263* (2013.01); *G06F 3/1275* (2013.01); *G06F 3/1285* (2013.01)

(58) Field of Classification Search
None
See application file for complete search history.

(56) References Cited

U.S. PATENT DOCUMENTS

| 6,256,474 | B1 * | 7/2001 | Gibisch | B41J 11/46 226/2 |
| 6,402,405 | B1 * | 6/2002 | Frodl | B41J 11/46 226/30 |
| 6,924,906 | B1 * | 8/2005 | Schwier | G06F 3/1207 358/1.4 |
| 2003/0053114 | A1 * | 3/2003 | Hopper | B41J 3/42 358/1.15 |
| 2005/0271446 | A1 * | 12/2005 | Minowa | B26D 5/30 400/621 |
| 2008/0055626 | A1 * | 3/2008 | Root | G03G 15/5012 358/1.14 |

(Continued)

FOREIGN PATENT DOCUMENTS

WO WO 2008/027183 A2 3/2008

OTHER PUBLICATIONS

European Search Report issued in EP 17 15 9853, dated Sep. 11, 2017.

*Primary Examiner* — Beniyam Menberu
(74) *Attorney, Agent, or Firm* — Birch, Stewart, Kolasch & Birch, LLP

(57) ABSTRACT

A method for printing a print job, the print job including a plurality of plots to be printed on a print media, includes receiving, by a reprographic printing system, the print job; causing printing the plots of the print job subsequently on the print media and tracking the completion of a plot in the print job while printing; and after receiving an interruption to the print job, terminating printing the plots of the print job and subsequently determining a print job related reference that is indicative for the interrupted print job, and printing a fiducial on the print media, the fiducial including an identifier uniquely identifying the interrupted print job, thereby defining a print job starting point for resuming the interrupted print job.

8 Claims, 6 Drawing Sheets

(56) References Cited

U.S. PATENT DOCUMENTS

| | | | |
|---|---|---|---|
| 2009/0118868 A1* | 5/2009 | Sato | B41J 11/663 700/275 |
| 2011/0211003 A1* | 9/2011 | Kusakabe | B41J 3/60 347/14 |
| 2011/0236111 A1* | 9/2011 | Fujii | G03G 15/238 400/583 |
| 2013/0025488 A1 | 1/2013 | Suriol et al. | |
| 2013/0257958 A1* | 10/2013 | Nagashima | B41J 11/009 347/16 |
| 2014/0064747 A1* | 3/2014 | Numazu | G03G 15/5062 399/19 |
| 2015/0022845 A1* | 1/2015 | Roscoe | G06K 15/408 358/1.14 |
| 2018/0272758 A1* | 9/2018 | Hori | B41J 11/0095 |

\* cited by examiner

US 10,684,805 B2

METHOD AND PRINTING SYSTEM FOR PROCESSING A PRINTJOB

CROSS REFERENCE TO RELATED APPLICATIONS

This application claims priority under 35 U.S.C. § 119(a) to Application No. 17159853.5, filed in Europe on Mar. 8, 2017, the entire contents of which is hereby incorporated by reference into the present application.

BACKGROUND OF THE INVENTION

Field of the Invention

The invention is in the field of printing systems, preferably comprising a roll printer, for processing print jobs in a flexible manner to deal with interruptions of the print job, the interruptions for example being caused by an urgent print job having priority above the print job currently processed on the print system.

Background of the Invention

Printing systems for printing images and a plurality of plots on a media are common use in professional printing service business. Such printing systems are running at a high usage grade to process massive orders and print jobs for generating plots on the print media, the print job typically being customer orders. The print job may include one or more plots. In some cases, the print job may be a large one and requires the printing system to print during a couple of hours. Some of these print jobs are arranged and scheduled by an operator manager far before delivery of the plots to the next step or to the client. Some of these print jobs however, enter the schedule late and need to be printed with a high level of urgency. Interruption may be due to a rush order coming in at sales and in these cases, the current print job needs to be interrupted to give the urgent print job priority in printing.

Another type of interruption is caused by exchanging a print media carrier in case the print media is printed on a first side after which the print media is to be printed on the second side opposite the first side. US2013/0025488A1 describes a system to print first-side and second-side images preventing from being mismatched or otherwise printed out of registration when printing resumes. At a certain distance of each plot, a fiducial is printed including an identifier for the second plot to automatically detect what to print upon detection of the identifier, which is used to match one front side plot to one back side plot for one-to-one mapping.

The described system does not allow a user friendly way to resume a print job after interruption either caused by an urgent print job that requires priority or that requires a print media carrier to be replaced. In such cases, the need of the presence and expertise of the operator manager is required to intervene in order to adjust settings of both the system and the print job status to prepare resumption. As such, it is a problem to resume printing of a print job after it is interrupted for some reason.

SUMMARY OF THE INVENTION

It is an object of the present invention to alleviate the above mentioned problem. To this end, a first aspect of the invention provides a method for printing a print job, the print job comprising a plurality of plots to be printed on a print media, the method comprising the steps of:
  receiving, by a reprographic printing system, the print job;
  causing printing the plots of the print job subsequently on the print media and tracking the completion of a plot in the print job while printing, and
  after receiving an interruption to the print job, terminating printing the plots of the print job and subsequently determining a print job related reference that is indicative for the interrupted print job, and printing a fiducial on the print media, the fiducial including an identifier uniquely identifying the interrupted print job, thereby defining a print job starting point for resuming the interrupted print job.

A second aspect of the invention provides a method for resuming a print job, the print job comprising a plurality of plots to be printed on a print media, the print job being stored in a printer controller as well as a print completion status for a plot in the print job, and the print job having a print job identifier, the method comprising the steps of:
  upon detection of a print media carrier being installed in a reprographic printing system, detecting the presence of an identifier on the print media;
  upon detecting the identifier, determining the print job identified by the identifier and determining the starting point for resuming the interrupted print job identified by the identifier based on the completion status;
  proceeding with resuming printing the identified print job by printing the plots remaining to be printed.

A third aspect of the invention provides a method for resuming a print job, the print job comprising a plurality of plots to be printed on a print media, the print job being stored in a printer controller as well as a print completion status for a plot in the print job, wherein the printed print media stored on the further print media carrier is provided with plots printed on a first side of the print media, wherein the further print media carrier is installed on the apparatus in such a way that the print media is exposed to printing on a second side of the print media opposite to the first side of the print media, and the print job having a print job identifier facing a sensor arranged at the apparatus for detecting the identifier to determine a resumed print job matching with the interrupted print job, the method comprising the steps of:
  upon detection of a print media carrier being installed in a reprographic printing system, detecting the presence of an identifier on the print media;
  upon detecting the identifier, determining the print job identified by the identifier and determining the starting point for resuming the interrupted print job identified by the identifier based on the completion status;
  proceeding with resuming printing the identified print job by printing the plots remaining to be printed.

A fourth aspect of the invention provides a printing system for printing a print job, the print job comprising a plurality of plots to be printed on a print media, the printing system comprising:
  a print job reception device for receiving, by a printing system, the print job;
  a printer controller for causing printing the plots of the print job subsequently on the print media, for tracking the completion of a plot in the print job while printing, and for, after receiving an interruption to the print job, terminating printing the plots of the print job, wherein the printer controller is configured for subsequently determining a print job related reference that is indicative for the interrupted print job, and an image forming unit configured for printing a fiducial on the print media, the fiducial including an identifier uniquely identifying the interrupted print job, thereby defining a print job starting point for resuming the interrupted print job. A fifth aspect of the invention provides a computer program product embodied on a non-transitory computer readable medium that, if executed on a processor, performs the steps of the method according to the first, second, and third aspect of the invention.

DETAILED DESCRIPTION OF THE INVENTION

The first aspect of the invention concerns a method for printing a print job according to claim 1. In this way, the interrupted print job is terminated with printing the fiducial on the print media, the fiducial including the identifier corresponding to the print job related reference of a status of the print job at the time that the print job was interrupted, the identifier directing to the print job starting point for resuming the interrupted print job, wherein the identifier is to be recognized by the printer device when the print media installed in the printing system is fed and passed along a means arranged for recognizing the identifier, so that the printing system is capable of resuming the interrupted print job where it was interrupted.

In an embodiment, after the fiducial is printed, the print media is fed until the identifier is slightly before a cutting device arranged at the printing system, wherein the print media is cut substantially transverse to the feeding direction of the printing system, and wherein the print media is rewound to store the identifier on a print media carrier arranged to resume the interrupted print job when the print media is reintroduced at the printer device. In this way, the print media is split into a first portion including the plots of the print job which have already been printed and a second portion including the identifier indicating the print job related reference that is indicative for the starting point of the print job for resuming the interrupted print job.

In an embodiment, after the print job interruption the last plot is printed, the print media is fed until the last plot has slightly passed a cutting device arranged at the printing system, wherein the print media is cut substantially transverse to the feeding direction of the printing system, wherein the print media is rewound to store the print media at the printing head arranged at the printing system, wherein subsequently the identifier is printed on the print media and wherein the print media is further rewound to store the identifier on a print media carrier arranged to resume the interrupted print job when the print media is reintroduced at the printer device. In this way, the print media is split into a first portion including the plots of the print job which have already been printed and a second portion including the identifier indicating the print job related reference that is indicative for the starting point of the print job for resuming the interrupted print job.

In an embodiment, after the fiducial is printed, the print media is fed until the identifier has slightly passed a cutting device arranged at the printing system, wherein the print media is cut substantially transverse to the feeding direction of the printing system, and wherein the print media including the fiducial is fed to be stored on a further print media carrier arranged to be used for a next print job. In this way, the print media is split into a first and second portion, the first portion including the plots of the print job which have already been printed and including the identifier indicating the print job related reference that is indicative for the starting point of the print job when resuming the interrupted print job on the first portion, the second portion forming print media to be used for a next print job.

The second aspect of the invention concerns a method for resuming a print job according to claim 5. In this way, the moment at which the print job is interrupted is determined to define the starting point along the print media to resume printing the interrupted print job in such a way that the plot generated in the resumed print job seamlessly fit to the plot generated until in the interrupted print job was interrupted.

The third aspect of the invention concerns a method for resuming a print job according to claim 6. In this way, a print media may be printed double sided so as to position the plots printed on the first side with the plots to be printed on the second side.

The fourth aspect of the invention concerns a printing system for printing a print job according to claim 7. In this way, the printing system is configured to terminate the interrupted print job by printing the fiducial on the print media, the fiducial including the identifier corresponding to the print job related reference of a status of the print job at the time that the print job was interrupted, the identifier directing to the print job starting point for resuming the interrupted print job, wherein the identifier is to be recognized by the printer device when the print media installed in the printing system is fed and passed along a means arranged for recognizing the identifier, so that the printing system is capable.

In an embodiment, the printer controller is configured to control a cutting device arranged at the printing system to cut the print media substantially transverse to the feeding direction of the printing system, and a feeding device arranged at the printing system to feed the print media through the printing system along a conveying direction, and wherein the printing system is configured, after the fiducial is printed on the print media, to feed the print media until the identifier is slightly before the cutting device, and wherein the printing system is configured to rewind the print media and to store the identifier on a print media carrier arranged to resume the interrupted print job when the print media is reintroduced at the printer device. In this way, the printing system is configured to split the print media into a first portion including the plots of the print job which have already been printed and a second portion including the identifier indicating the print job related reference that is indicative for the starting point of the print job for resuming the interrupted print job.

In an embodiment, the printer controller is configured to control a cutting device arranged at the printing system to cut the print media substantially transverse to the feeding direction of the printing system, and a feeding device arranged at the printing system to feed the print media through the printing system along a conveying direction, and wherein the printing system is configured, after the print job interruption the last plot is printed, to feed the print media until the last plot has slightly passed a cutting device arranged at the printing system, to cut the print media substantially transverse to the feeding direction of the printing system, to rewind the print media to store the print media at the printing head arranged at the printing system, to subsequently print the identifier on the print media and to further rewind the print media to store the identifier on a print media carrier arranged to resume the interrupted print job when the print media is reintroduced at the printer device. In this way, the printing system is configured to split the print media into a first portion including the plots of the print job which have already been printed and a second portion including the identifier indicating the print job related reference that is indicative for the starting point of the print job for resuming the interrupted print job.

In an embodiment, the printer controller is configured to control a cutting device arranged at the printing system to cut the print media substantially transverse to the feeding direction of the printing system, and a feeding device arranged at the printing system to feed the print media through the printing system along a conveying direction, and wherein the printing system is configured, after the fiducial is printed, to feed the print media until the identifier has slightly passed the cutting device arranged at the printing system, to cut the print media substantially transverse to the feeding direction of the printing system, and to rewind the print media to store the unprinted print media on a print media carrier arranged to be used for a next print job. In this way, the printing system is configured to split the print media into a first and second portion, the first portion including the plots of the print job which have already been printed and including the identifier indicating the print job related reference that is indicative for the starting point of the print job when resuming the interrupted print job on the first portion, the second portion forming print media to be used for a next print job.

In an embodiment, the printing controller is arranged to receive the further print media carrier comprising the printed print media which is provided with plots printed on a first side of the print media, so as to expose the print media to printing on a second side of the print media opposite to the first side of the print media, and wherein a sensor is arranged at the printing system for detecting the identifier to determine a print job to be resumed matching with the interrupted print job. In this way, the printing system is configured to print a print media double sided so as to resume printing the plots printed on the first side with the plots to be printed on the second side.

In an embodiment, the printing system comprises a sensor arranged for, upon detection of the print media carrier being installed, detecting the presence of the identifier on the print media; the printer controller being arranged for, upon detecting the identifier, determining the print job identified by the identifier, for determining the starting point for resuming the interrupted print job identified by the identifier, and for proceeding with resuming printing the identified print job by printing the plots remaining to be printed. In this way, the printing system is configured to resume and continue the print job as from its status at which it was interrupted and the print job may be finished with a distinct result which is undetectable or hardly to detect.

BRIEF DESCRIPTION OF THE DRAWINGS

For the purpose of illustrating the invention, the drawings show aspects of one or more embodiments of said invention. However, it should be understood that the present invention is not limited to the precise arrangements and instrumentalities shown in the drawings, wherein.

DETAILED DESCRIPTION OF THE PREFERRED EMBODIMENTS

It should be noted that items which have the same reference numbers in different figures, have the same structural features and the same functions. Where the function and/or structure of such item has been explained, there is no necessity for repeated explanation thereof in the detailed description.

Figure 1A:
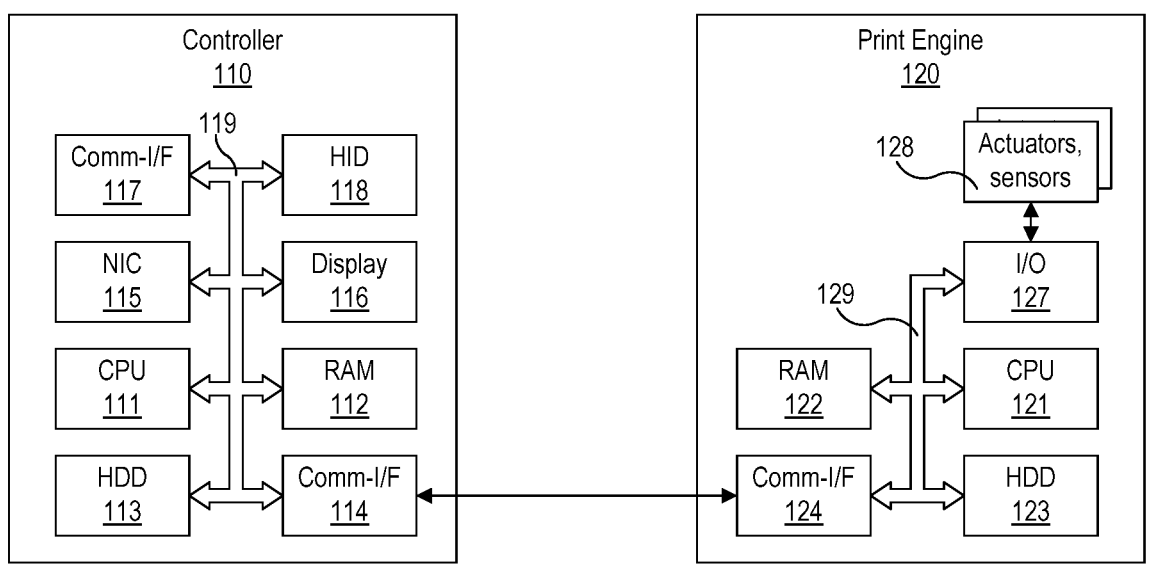
FIG. 1A is a block diagram showing the components such as a controller and a print engine of a general printer to which the invention may be applied.

FIG. 1A depicts a controller 110 and a print engine 120 comprised in a typical reprographic printing system such as a printer 1 schematically depicted in FIGS. 2, 3 and 4. The printer 1 according to invention described herein, is configured to perform a method for printing a print job. The print job comprises printing of a plurality of plots on a print media 3. The print media 3 is typically made from paper but other print media such as textile and fabric are conceivable as well.

The reprographic printing system 1 is configured to print, after the reprographic printing system 1 has received the print job, the plots of the print job subsequently on the print media 3. To this end, such a reprographic printing system 1 comprises the controller 110 and the print engine 120 which will be described now. The engine 120 is responsible for low-level control of the printing system. It deals with individual hardware components that are responsible for the reprographic process such as drives for media transport, media detectors (in the media path as well as in the input and output media trays), path switches, fusers, print heads, etc.; in general actuators and sensors 128. These actuators and sensors are connected through input/output (I/O) boards 127 to a bus 129. The bus 129 connects the major components in the engine 120. Actual data processing takes place in a central processing unit (CPU) 121. The CPU 121 reads sensor values from the sensors 128 through the I/O 127. Based on these sensor values and other data such as print data and print commands received from the controller 110, the CPU 121 determines how the engine 120 should respond to this information and determines appropriate actuation values that are sent through the I/O 127 to the actuators 128. The engine 120 comprises a volatile memory such as a random access memory (RAM) 122 to temporarily store data for processing such as the print data and print commands received from the controller 110, and the sensor values read from the sensors 128. Furthermore, a non-volatile memory such as a hard disk drive (HDD) 123 serves to store data in a more permanent manner, for example to survive a power down of the system. This hard disk drive 123 typically also stores embedded software comprising computer instructions that are run on the CPU 121. The engine 120 typically runs a real-time Operating System (RTOS), for example a soft real-time Operating System in order to deal with the time critical functions of controlling the actuators 128. The engine 120 further comprises a communication device 124 to communicate with the controller 110. Typically, the engine 120 receives print data and print commands from the controller 110 and provides back status information on the engine 120 itself and on the processing of the print commands and print data, including sending error messages to the controller 110.

The controller 110 is connected to the engine 120 through a communication device 114 that communicates with the communication device 124 of the engine 120. These communication devices 114, 124 may be implemented as Ethernet network interface controllers (NIC). Processing in the controller 110 is done by a CPU 111 that is connected to all the other components in the controller 110 through a bus 119. The data to be processed is temporarily stored in a volatile memory such as RAM 112, while data is stored in a more permanent manner in a non-volatile memory such as hard disk drive 113, for example in order to survive power downs, but also to relieve the volatile memory 112 which typically has a smaller storage size. The hard disk drive 113 typically stores print jobs, each comprising print data and a job ticket. Furthermore, the hard disk drive 113 comprises converted print data which is print data converted to a format suitable for processing by the engine 120. Typically the converted print data comprises raster images. Converting the print data in the print jobs to converted print data is typically done in a Raster Image Processor (RIP). Although the RIP may be a dedicated hardware device, it is common to be implemented in software and running on CPU 111. As the RIP-process is rather computationally intensive, it is common for controllers 110 to have multiple processing units in the form of a multi-core CPU 111 or multiple CPUs 111. The controller 110 further comprises a display 116 to show messages to an operator, or display a complete graphical user interface (GUI) to an operator for operating the reprographic printing system. The display 116 is supplemented by a human interface device (HID) 118 such as a keyboard, mouse, touchpad, stylus, or touch sensitive panel integrated into display 116, and allows the operator to operate the reprographic printing system. The controller 110 comprises a communication interface 117 for communicating with peripheral devices such as finisher, for example, stackers, staplers, binders, punchers, cutters, trimmers, folders, media input units, etc. The controller 110 further comprises a network interface card (NIC) 115 to connect the controller 110 to a computer network, the network interface functioning as a print job reception device 115. Through the network connection, print jobs may be submitted to the controller 110 and the results of scan jobs may be retrieved from the controller 110. For these operations the controller 110 may be directly in communication with individual workstations, or indirectly through a print server. Furthermore, the network connection may be used to remotely operate the reprographic printing system, monitor its status, and send production data to monitoring systems, accounting systems, or business information systems. Note that in smaller printer models, specifically printers suitable for placement on desks, it is common to use communication interfaces such as USB, FireWire, or Bluetooth instead of the NIC 115.

The controller 110 and the engine 120 may be implemented in a single printer device (typical for smaller printers for low volume printing), or as two separate, but interconnected devices (typical for larger, high-volume production printers).

The engine 120 typically deals with print data on a sheet level, swath level, or even line level. The engine 120 is typically not aware of information on a document or even job level. In contrast the controller 110 typically receives print jobs comprising one or more documents, the documents typically comprising multiple pages.

The reprographic printing system 1 is configured to print, after the reprographic printing system has received the print job, the plots of the print job subsequently on the print media 3 and, according to the invention, to track the completion of a plot in the print job while printing. The duration of a print job is determined by the number and type of plots to be printed consecutively. In case the print job takes a long time, urgent print jobs typically require getting priority over the current print job. Such current print job thus needs to be interrupted due to a rush order coming in at sales and it is desirable to temporary finish the current print job, then to perform the urgent print job and then to resume the print job which was interrupted earlier so that the plots generated in the earlier print job may still be used to complete that print job. To this end, the reprographic printing system 1 is configured to, after receiving an interruption to the print job, terminate printing the plots of the print job and to subsequently determine a print job related reference that is indicative for the interrupted print job, and to print a fiducial on the print media 3. The fiducial 4 includes, according to the invention, an identifier 4 uniquely identifying the interrupted print job, thereby defining a print job starting point for resuming the interrupted print job.

Figure 1B:
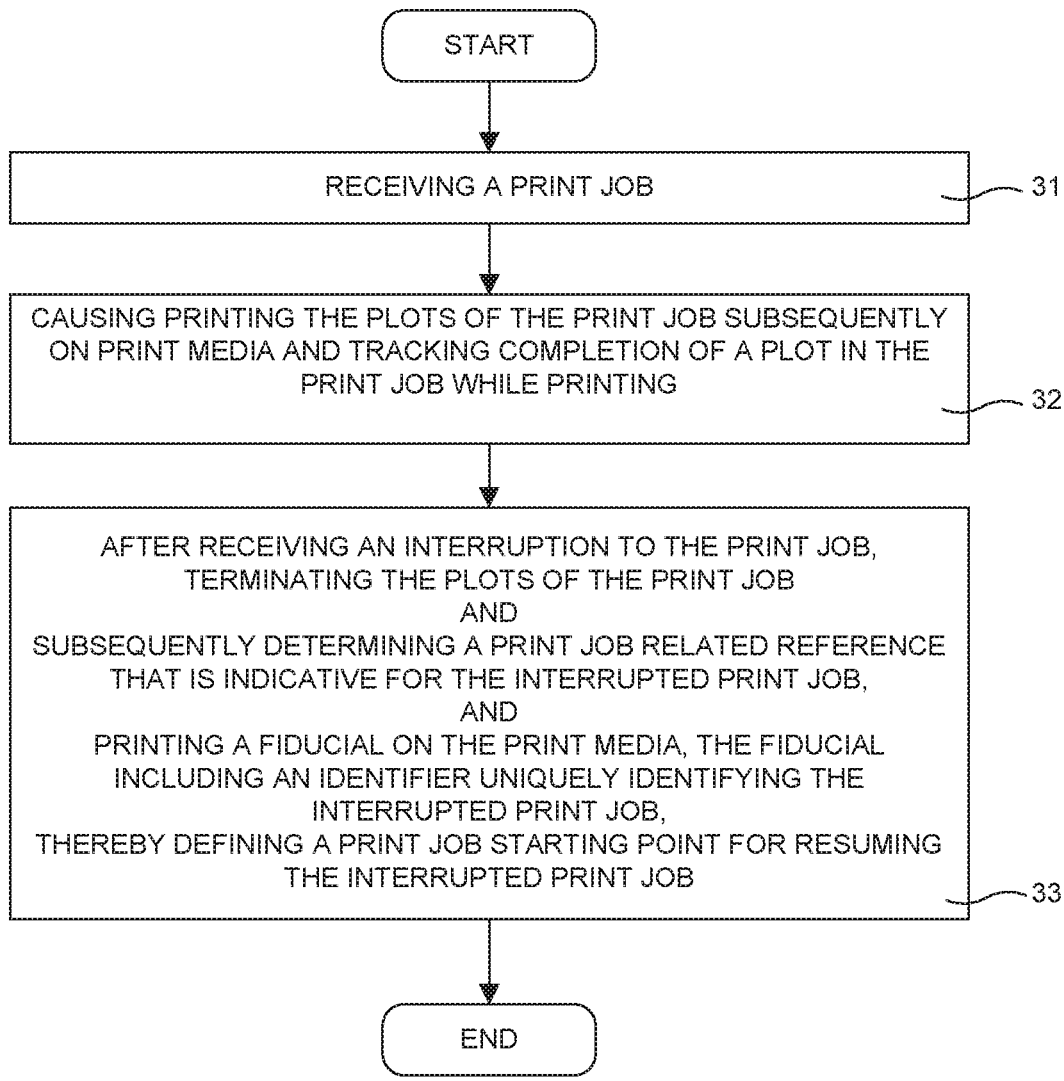
FIG. 1B is a flow chart showing the steps of the first aspect of the invention.
Figure 1C:
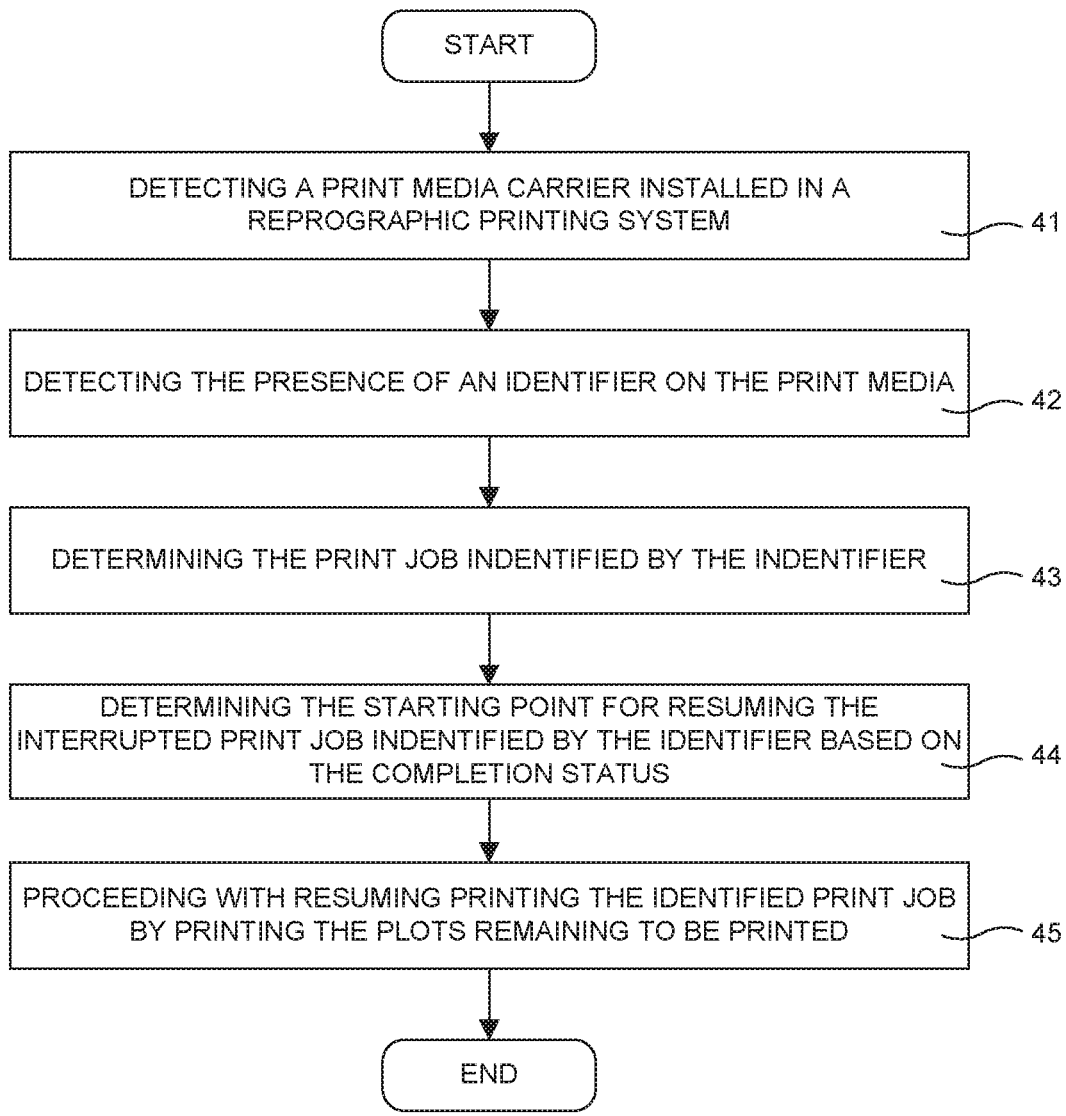
FIG. 1O is a flow chart showing the steps of the second aspect of the invention.

FIG. 1B shows a flow chart of the method for processing the print job according to the invention. The controller 110 receives 31 a print job. The controller 110 causes 32 the printing of the plots of the print job subsequently on print media and tracks completion of a plot in the print job while printing. After receiving an interruption to the print job, the controller 110 causes 33 terminating the plots of the print job and subsequently determining a print job related reference that is indicative for the interrupted print job, and printing a fiducial on the print media, the fiducial including an identifier uniquely identifying the interrupted print job, thereby defining a print job starting point for resuming the interrupted print job. FIG. 1C shows a flow chart of the method for processing the resumption of the interrupted print job.

Before resuming the print job, the print job is typically stored in the printer controller 110 as well as a print completion status for a plot in the print job. To match the print job with the print media to resume the print plot at, a print job identifier 4 is required to be present on the print media 3. Upon detection 41 of a print media carrier 11 being installed in a reprographic printing system 1, the presence of the identifier 4 on the print media 3 needs to be detected by means of a sensor 7. Upon detecting 42 the identifier 4, the print job identified by the identifier 4 needs to be determined 43. And the starting point needs to be determined 44 for resuming the interrupted print job identified by the identifier 4 based on the completion status. After that, resuming 45 printing the identified print job by printing the plots remaining to be printed may be started.

Figure 2A:
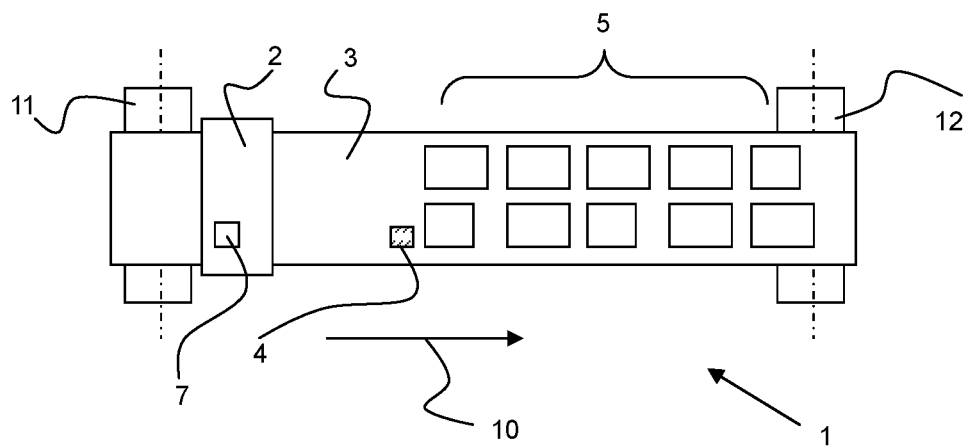
FIG. 2A-C is a schematic top view of a first embodiment of a reprographic printing system according to the invention,
showing subsequent steps of a first embodiment of the method according to the invention.
Figure 2B:
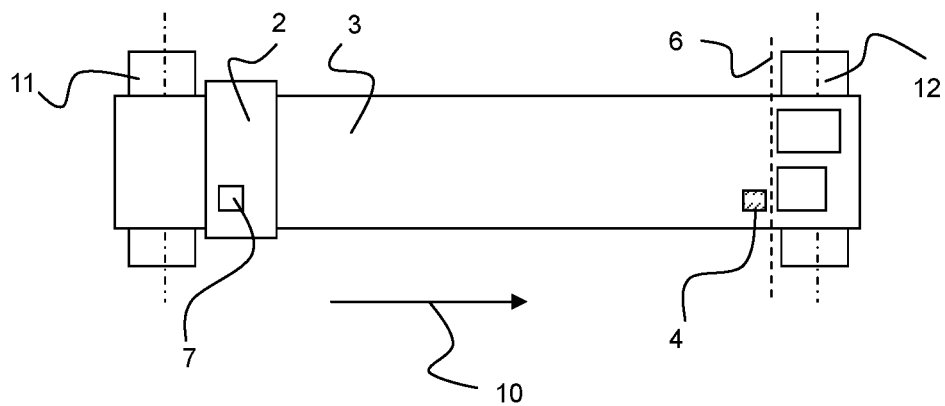

FIG. 2A shows reprographic printing system 1 having a print media carrier 11 whereupon a print media 3 is stored to be supplied to a print head 2 locating near the print media 3 spanned between the print media carrier 11 and print media carrier 12 whereupon the print media 3 is to be stored after plots 5 of the print jobs have been printed on the printed print media 3. In this example, the print head 2 is arranged near the print media carrier 11 and a cutting device 6 depicted in FIG. 2B, is arranged near the print media carrier 12 so as to allow a path between the print head 2 and the cutting device 6 for transporting the print media 3 along a feeding direction 10.

For determining a print job starting point for resuming the interrupted print job, the print head 2 applies, after having already printed the one or more plots 5 of the interrupted print job on the print media 3, the fiducial 4 forming the identifier 4 uniquely identifying the interrupted print job. Referring to FIG. 2A, the fiducial 4 is printed, upon receiving an interruption of the print job, on the print media 3, upon which the controller 110 causes the print head 2 to cease printing and to feed the print media 3 along the feeding direction 10 until the identifier 4 is slightly before the cutting device 6 arranged at the printing system 1. As soon as identifier 4 approaches the cutting device 6, the controller 110 causes the print media 3 to cease running and to operate the cutting device 6 so as to cut the print media 3 substantially transverse to the transport direction 10 of the printing system 1.

Figure 2C:
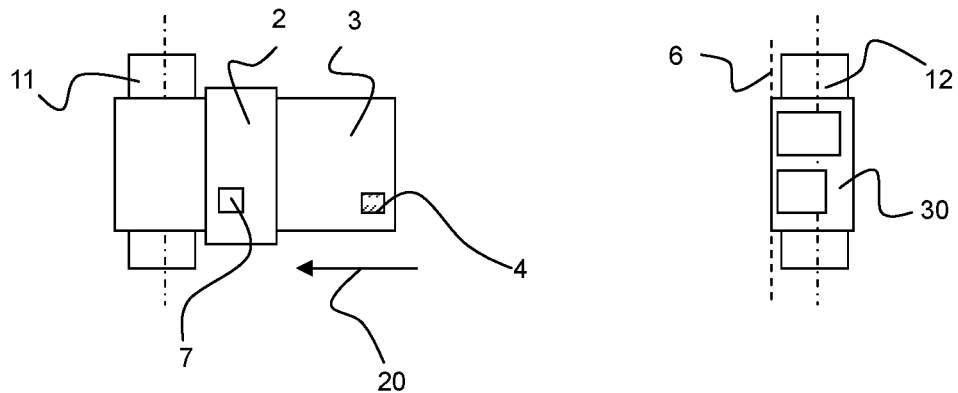

The controller 110 causes the print media 3 to be rewound in the opposite direction 20 depicted in FIG. 2C to store the print media 3 including the identifier 4 on the print media carrier 11. The print media carrier 11 is arranged for resuming the interrupted print job when the print media 3 is reintroduced at the printer device 1. The controller 110 causes the print media 3 comprising the printed plots 5 of the print job to be wound to store the plots 5 on the print media carrier 12. According to this procedure, the print job is interrupted while information about the status of the interrupted print job has been tracked and linked to in the fiducial 4 printed on the print media 3 located at the print media carrier 11 to use later when resuming the interrupted print job.

In the examples shown in FIGS. 2 and 3, the sensor 7 for detecting at least the fiducial or the identifier 4, is arranged in such a way relative to the print media 3 that the sensor faces the print media 3 from the same side as the print head 2 faces the print media 3 to be printed.

Figure 3A:
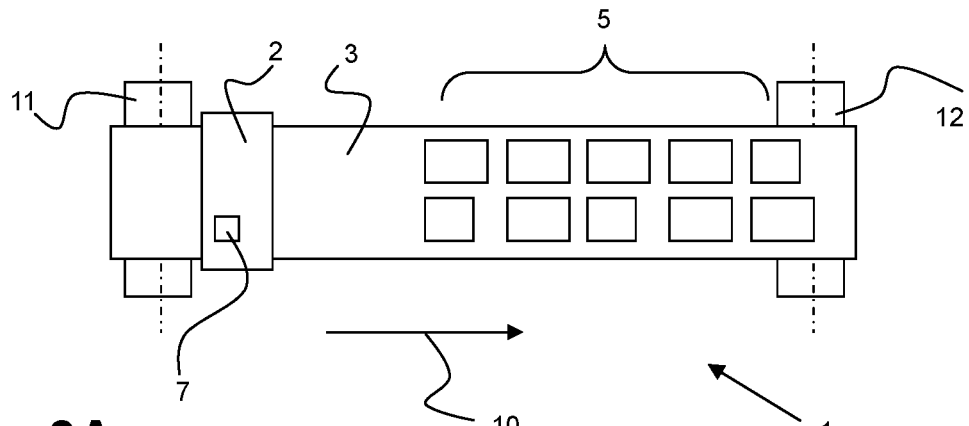
FIG. 3A-C is a schematic top view of a second embodiment of a reprographic printing system according to the invention, showing subsequent steps of a second embodiment of the method according to the invention.
Figure 3B:
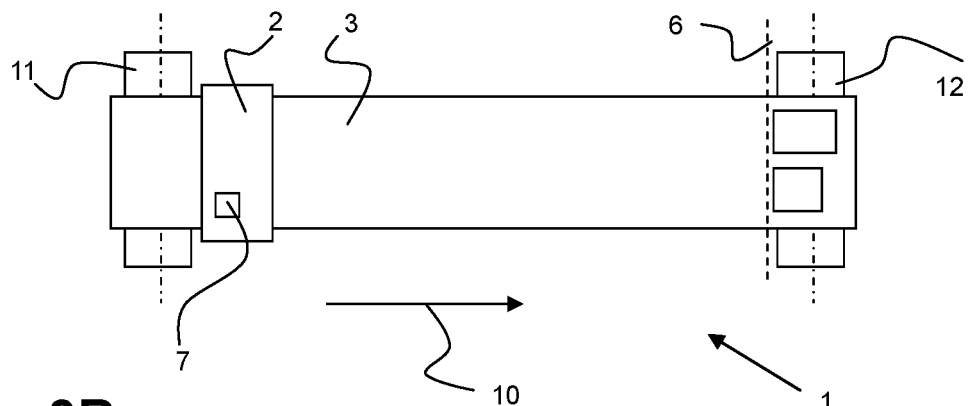
Figure 3C:
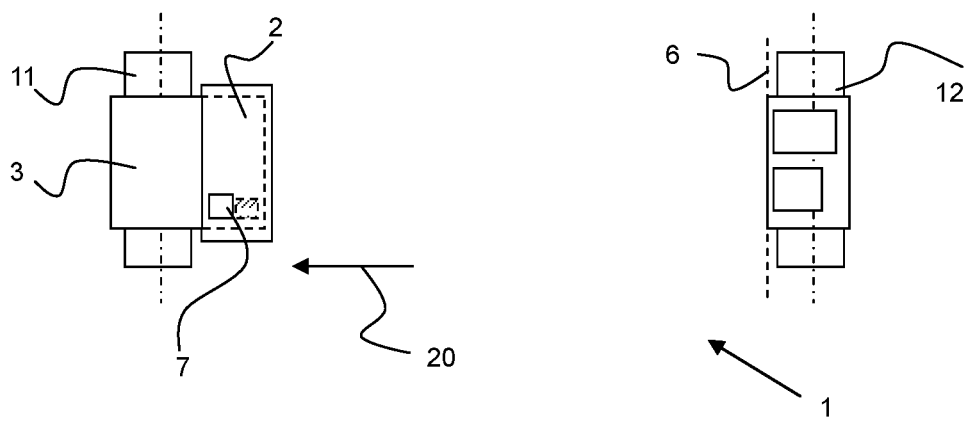

FIG. 3A shows a reprographic printing system 1 similar to the reprographic printing system 1 depicted in FIG. 2A. Upon the print job interruption, the controller 110 operates the print media 3 to be fed until the last plot has slightly passed the cutting device 6 as shown in FIG. 3B. The controller 110 causes the print media 3 to cease running and to operate the cutting device 6 so as to cut the print media 3 substantially transverse to the transport direction 10 of the printing system 1. The print media 3 is to be rewound in the opposite direction 20 depicted in FIG. 3C to store the print media 3 on the print media carrier 11 near the printing head 2 so as to position the print media 3 in such a way with respect to the print head 2 to apply, on the print media 3, the fiducial 4 forming the identifier 4 uniquely identifying the interrupted print job. Subsequently the print media 3 is further rewound to store the identifier on a print media carrier 11 arranged for resuming the interrupted print job when the print media 3 is reintroduced at the printer device 1. In the meantime, the controller 110 operates the print media carrier 12 to wind the print media 3 comprising the printed plots 5 of the print job and store the plots 5 on the print media carrier 12. According to this procedure, the print job is interrupted while information about the status of the interrupted print job has been tracked and linked to in the fiducial 4 printed on a print media carrier 11 to use later when resuming the interrupted print job.

Figure 4A:
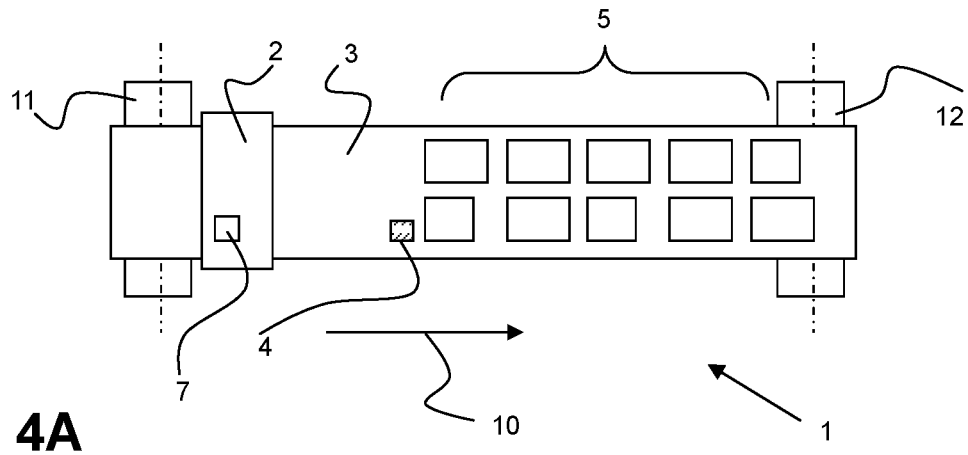
FIG. 4A-C is a schematic top view of a third embodiment of a reprographic printing system according to the invention, showing subsequent steps of a third embodiment of the method according to the invention.
Figure 4B:
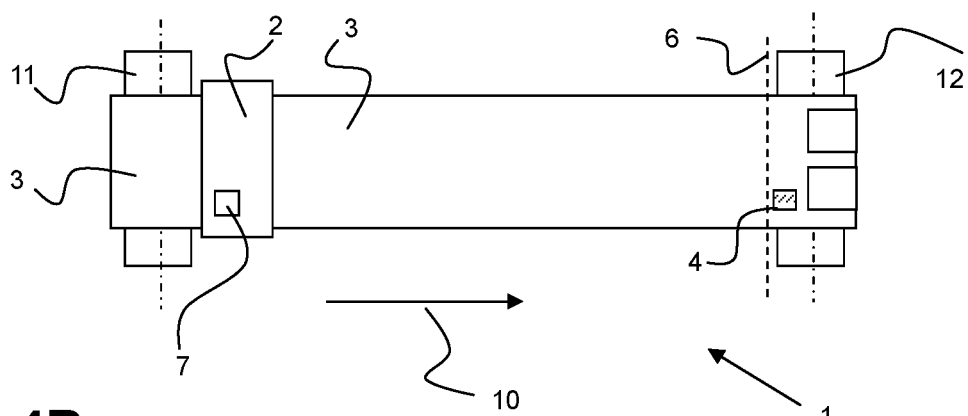

FIG. 4A shows reprographic printing system 1 similar to the reprographic printing system 1 depicted in FIGS. 2A and 3A. For determining a print job starting point for resuming the interrupted print job, the print head 2 applies, after having already printed the one or more plots 5 of the interrupted print job on the print media 3, the fiducial 4 forming the identifier uniquely identifying the interrupted print job. Referring to FIG. 4A, the fiducial 4 is printed, upon receiving an interruption of the print job, on the print media 3, upon which the controller 110 causes the print head 2 to cease printing and to feed the print media 3 along the feeding direction 10 until the identifier 4 has slightly passed the cutting device 6 as shown in FIG. 4B. The controller 110 causes the print media 3 to cease and to operate the cutting device 6 so as to cut the print media 3 substantially transverse to the transport direction of the printing system 1.

Figure 4C:
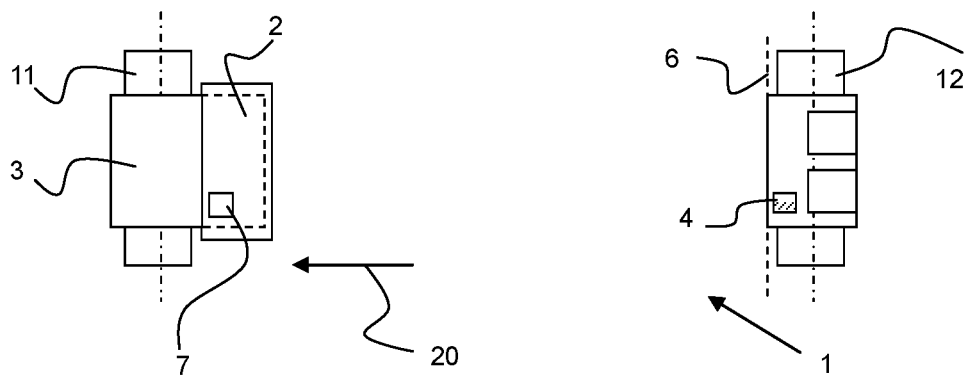

The controller 110 causes the print media 3 to be rewound in the opposite direction 20 depicted in FIG. 4C to store the unprinted print media for using it at a further print job. The controller 110 causes the print media 3 comprising the printed plots 5 of the print job including the identifier 4 to be wound to store the plots 5 and the identifier 4 on the print media carrier 12. According to this procedure, the print job is interrupted while information about the status of the interrupted print job has been tracked and linked to in the fiducial 4 printed on a print media carrier 12 to use later when resuming the interrupted print job.

The print media carrier 12 storing the print media 3 provided with the printed plots 5 and the identifier 4 is typically useful for print jobs including printing plots on both sides of the print media 3. According to such method, the print media 3 stored on the print media carrier 12 having the plots 5 and the identifier 4 present on a first side of the print media 3, may be exposed to printing on a second side of the print media 3 opposite to the first side of the print media 3. This may for example be achieved by a printer 1 adapted for receiving the print media carrier 12 so as to allow feeding the print media 3 along the print head 2 in such a way that the second side of the print media 3 is facing the print head 2 so as to be exposed to printing. To detect the fiducial 4 locating on the first side, the sensor 7 is arranged in such a way relative to the print media 3 that the sensor 7 faces the print media 3 from the opposite side as the print head 2 faces the print media 3 to be printed.

In an example, the print job related reference corresponds to either the plots of the print job which have already been printed or the plots of the print job which remain to be printed. In this way, the printing system is configured to determine the moment at which the print job is interrupted to define the starting point along the print media to resume printing the interrupted print job in such a way that the plot generated in the resumed print job seamlessly fit to the plot generated in the interrupted print job. Note that it is preferred though to have the reference correspond to an identifier of a print job stored in the controller 110 and have the controller 110 track the progress by tracking the completion status of the plots in the print job.

It should be noted that the above-mentioned embodiments illustrate rather than limit the invention, and that those skilled in the art will be able to design many alternative embodiments.

What is claimed is:

1. A method for printing a print job, the print job comprising a plurality of plots to be printed on a print media, the method comprising the steps of:

receiving, by a reprographic printing system, the print job;

causing printing the plots of the print job subsequently on the print media and tracking the completion of a plot in the print job while printing, and after receiving an interruption to the print job, terminating printing the plots of the print job and subsequently determining a print job related reference that is indicative for the interrupted print job, and printing a fiducial on the print media, the fiducial including an identifier uniquely identifying the interrupted print job, thereby defining a print job starting point for resuming the interrupted print job, wherein after the fiducial is printed, the print media is fed until the identifier is slightly before a cutting device arranged at the printing system, wherein the print media is cut substantially transverse to the feeding direction of the printing system, and wherein the print media is rewound to store the identifier on a print media carrier arranged to resume the interrupted print job when the print media is reintroduced at the printer device.

2. A computer program product embodied on a non-transitory computer readable medium that, if executed on a processor, performs the steps of the method according to claim 1.

3. A method for printing a print job, the print job comprising a plurality of plots to be printed on a print media, the method comprising the steps of:

receiving, by a reprographic printing system, the print job;

causing printing the plots of the print job subsequently on the print media and tracking the completion of a plot in the print job while printing, and after receiving an interruption to the print job, terminating printing the plots of the print job and subsequently determining a print job related reference that is indicative for the interrupted print job, and printing a fiducial on the print media, the fiducial including an identifier uniquely identifying the interrupted print job, thereby defining a print job starting point for resuming the interrupted print job, wherein after the print job interruption the last plot is printed, the print media is fed until the last plot has slightly passed a cutting device arranged at the printing system, wherein the print media is cut substantially transverse to the feeding direction of the printing system, wherein the print media is rewound to store the print media at the printing head arranged at the printing system, wherein subsequently the identifier is printed on the print media and wherein the print media is further rewound to store the identifier on a print media carrier arranged to resume the interrupted print job when the print media is reintroduced at the printer device.

4. A computer program product embodied on a non-transitory computer readable medium that, if executed on a processor, performs the steps of the method according to claim 3.

5. A printing system for printing a print job, the print job comprising a plurality of plots to be printed on a print media, the printing system comprising:

a print engine; and a printer controller connected to the print engine, the printer controller being configured to receive the print job, to cause the print engine to print the plots of the print job subsequently on the print media, to track the completion of a plot in the print job while printing, and to, after receiving an interruption to the print job, terminate printing the plots of the print job, wherein the printer controller is further configured for subsequently determining a print job related reference that is indicative for the interrupted print job, and an image forming unit including a print head configured for printing a fiducial on the print media, the fiducial including an identifier uniquely identifying the interrupted print job, thereby defining a print job starting point for resuming the interrupted print job, wherein the printer controller is configured to control a cutting device arranged at the printing system to cut the print media substantially transverse to the feeding direction of the printing system, and a feeding device arranged at the printing system to feed the print media through the printing system along a conveying direction, and wherein the printing system is configured, after the fiducial is printed on the print media, to feed the print media until the identifier is slightly before the cutting device, and wherein the printing system is configured to rewind the print media after being cut by the cutting device and to store the identifier on a print media carrier arranged to resume the interrupted print job when the print media is reintroduced at the printer device.

6. The printing system according to claim 5, wherein a sensor is arranged for, upon detection of the print media carrier being installed, detecting the presence of the identifier on the print media;

the printer controller is arranged for, upon detecting the identifier, determining the print job identified by the identifier, for determining the starting point for resuming the interrupted print job identified by the identifier, and for proceeding with resuming printing the identified print job by printing the plots remaining to be printed.

7. A printing system for printing a print job, the print job comprising a plurality of plots to be printed on a print media, the printing system comprising:

a print engine; and a printer controller connected to the print engine, the printer controller being configured to receive the print job, to cause the print engine to print the plots of the print job subsequently on the print media, to track the completion of a plot in the print job while printing, and to, after receiving an interruption to the print job, terminate printing the plots of the print job, wherein the printer controller is further configured for subsequently determining a print job related reference that is indicative for the interrupted print job, and an image forming unit including a print head configured for printing a fiducial on the print media, the fiducial including an identifier uniquely identifying the interrupted print job, thereby defining a print job starting point for resuming the interrupted print job, wherein the printer controller is configured to control a cutting device arranged at the printing system to cut the print media substantially transverse to the feeding direction of the printing system, and a feeding device arranged at the printing system to feed the print media through the printing system along a conveying direction, and wherein the printing system is configured, after the print job interruption the last plot is printed, to feed the print media until the last plot has slightly passed a cutting device arranged at the printing system, to cut the print media substantially transverse to the feeding direction of the printing system, to rewind the print media to store the print media at the printing head arranged at the printing system, to subsequently print the identifier on the print media and to further rewind the print media to store the identifier on a print media carrier arranged to resume the interrupted print job when the print media is reintroduced at the printer device.

8. The printing system according to claim 7, wherein
a sensor is arranged for, upon detection of the print media carrier being installed, detecting the presence of the identifier on the print media;
the printer controller is arranged for, upon detecting the identifier, determining the print job identified by the identifier, for determining the starting point for resuming the interrupted print job identified by the identifier, and for proceeding with resuming printing the identified print job by printing the plots remaining to be printed.

* * * * *